Patented Mar. 22, 1949

2,464,869

UNITED STATES PATENT OFFICE 2,464,869

HALOGEN CONTAINING DERIVATIVES OF DICARBOXYLIC ACIDS

Morris S. Kharasch, Chicago, Ill., assignor to United States Rubber Company, New York, N. Y., a corporation of New Jersey No Drawing. Application October 25, 1947, Serial No. 782,219

4 Claims. (Cl. 260—485)

This invention relates to the synthesis of a new class of chemicals consisting of the 1,1,1-trichloro-5-bromo-2,3-dicarbalkoxy alkanes and their dehydrobrominated derivatives which are 1,1,1-trichloro-2,3-dicarbalkoxy-4-alkenes. These new compounds have the type formulae

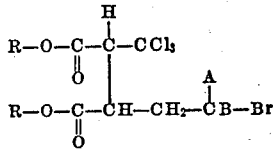

and

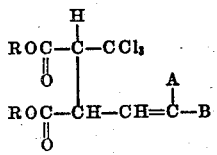

respectively, wherein R is a saturated aliphatic hydrocarbon radical, A is either hydrogen or a hydrocarbon radical, and B is either hydrogen or a hydrocarbon radical.

These new chemicals which are useful as intermediates in organic synthesis in the preparation of dyes, pharmaceuticals, plasticizers, insecticides and resins are produced by causing dialkyl esters of alpha - bromo - beta-trichloromethyl succinic acid to react with an ethylenically unsaturated organic compound by manitaining the dialkyl alpha - bromo - beta - trichloromethyl succinate and the unsaturated compound in contact with a peroxidic catalyst until the 1,1,1-trichloro-5-bromo-2,3-dicarbalkoxy alkane is formed. This product readily loses hydrogen bromide to form a 1,1,1-trichloro-2,3-dicarbalkoxy-4-alkene.

The dialkyl esters of alpha-bromo-beta-trichloromethyl succinic acid which are used in accordance with the present invention to produce the novel and useful 1,1,1-trichloro-5-bromo-2,3-dicarbalkoxy alkanes and the 1,1,1-trichloro-2,3-dicarbalkoxy-4-alkenes may be produced by the methods disclosed and claimed in my copending application 782,220, filed Oct. 25, 1947.

These dialkyl esters may be produced by the free radical initiated reaction between trichlorobromomethane and either a dialkyl fumarate or a dialkyl maleate such as for example by the photochemical reaction between trichlorobromomethane and dimethyl fumarate.

Among the terminally unsaturated organic compounds which are suitable in the practice of my invention are:

1. Octene-1
2. Isobutylene
3. Methallyl chloride
4. Undecylenic acid esters (preferably the methyl esters)
5. Butene-1
6. 2-ethyl butene-1
7. Allyl chloride (Olefins containing an aromatic group attached to a carbon of the ethylenic structure, i. e., styrene, are excluded, since they will polymerize.)

Also, cyclic olefins, such as cyclohexene are excluded, since no addition in the manner indicated takes place.

Among the peroxidic polymerization catalysts which may be employed in my invention are the diacyl peroxides such as dibenzoyl and diacetyl peroxide, alkyl hydroperoxides such as tert-butyl hydroperoxide, hydrogen peroxide, per salts such as sodium persulfate and the like.

The following examples are illustrative of my invention:

EXAMPLE 1

*Preparation of 1,1,1 - trichloro-3-bromo-2,3-dicarbmethoxypropane (dimethyl alpha-bromo-beta-trichloromethyl succinate)*

A mixture of bromotrichlormethane (198 g., 1.0 mole) and dimethyl fumarate (36 g., 0.25 mole) is internally irradiated by a mercury vapor-neon, fluorescent tube for twenty-four hours. The temperature of the reactants is maintained at 50–60° C. by the illuminating coil. The undissolved, crystalline fumarate ester completely disappears in fifteen hours. Unreacted bromotrichloromethane (155 g.) is recovered by distillation at 101–104° C. at atmospheric pressure. Further distillation of the viscous residue (75.5 g.) at .1 mm. yields 2 g. of unchanged dimethyl fumarate at 75–90° C. a colorless oil (fraction I) (57 g.) at 95–108° C. which partly solidifies and a viscous, light yellow oil (fraction II) (11.9 g.) at 180–185° C. A black, viscous residue (4.1 g.) remains.

Hydrogen bromide is evolved during the latter part of the distillation.

The solid from fraction I is separated from the oil and after twice recrystallizing from methanol gives a white crystalline solid (M. P. 54–55° C.) with a halogen analysis consistent with 1,1,1-trichloro-3-bromo-2,3-dicarbmethoxy-propane.

Anal. calcd. for $C_7H_8O_4BrCl_3$—Ag equiv., 85.6. Found: Ag equiv., 64.8.

EXAMPLE 2

*Peroxide-induced addition of 1,1,1-trichloro-3-bromo-2,3-dicarbmethoxy propane to octene-1*

The 1:1 adduct of trichlorobromomethane and dimethyl fumarate (fraction I of Example 1) (11.42 g., 0.033 mole) and acetyl peroxide (0.2 g.) are dissolved in octene-1 (11.2 g., 0.1 mole) at 75–80° C. with stirring over a period of three hours. The stirring and temperature are maintained for one hour after addition is complete. After cooling, the unreacted octene (18.0 g.) is distilled at reduced pressure. Further distillation of the residue gives a slightly viscous, colorless liquid (11.3 g.) distilling at 160–170° C. at .1 mm. and an orange-black residue (1.7 g.). Hydrogen bromide is given off during the distillation and collected in a liquid nitrogen trap. The addition product (10.1 g.) is treated with the calculated amount of sodium methylate in methanol to remove all bromine in the molecule. The product (7.1 g.) distills at 165–170° C. at .2 mm. and is only slightly viscous. The halogen analysis and molecular weight are consistent with 1,1,1-trichloro-2,3-dicarbmethoxyundecene-4.

Anal. calcd. for $C_{15}H_{23}O_4Cl_3$—Cl, 28.6. Found: Cl, 28.0.

Molecular wgt. calcd. for $C_{15}H_{23}O_4Cl_3$—373.5. Found: 370.5.

*Identification of addition product of bromotrichloromethane-dimethyl fumarate 1:1 addition product to octene-1 (1,1,1-trichloro-5-bromo-2,3-dicarbmethoxyundecane)*

A 4.9 g. sample of the unsaturated addition product is dissolved in ethyl acetate and treated with ozone at −75° C. The ethyl acetate was evaporated in vacuo and the oily residue is treated with water at 25° C. for twenty-four hours and at 60° C. for two hours. It is then steam distilled and the distillate is extracted with ether. The oily extract (0.5 g.), similar in odor to heptaldehyde, gives a precipitate with 2,4-dinitrophenylhydrazine reagent. The precipitate is recrystallized from ethanol. It melts at 101–103° C. and does not depress the melting point of an authentic sample of the 2,4-dinitrophenylhydrazone of heptaldehyde. No evidence of the presence of oxalic acid is found in another portion of the steam distillate after oxidizing with 30% hydrogen peroxide and refluxing with dilute hydrochloric acid.

The water insoluble residue, non-volatile in steam, is separated, dried and fractionated giving 1.0 g. of oil distilling at 145–155° C. at .1 mm. as well as 2.4 g. of oil distilling at 165–170° C. which is probably unchanged starting material. The lower boiling fraction has a halogen analysis approximating 1,1,1-trichloro-2,3-carbmethoxybutyraldehyde.

Anal. calcd. for $C_9H_{10}O_5Cl_3$—Cl, 34.6. Found: Cl, 33.0.

If one substitutes for the octene-1 in Example 2 any olefinic compound from the group consisting of isobutylene, methallyl chloride, alkyl undecylenic acid esters, butene-1,2-ethyl butene-1 and allyl chloride the reaction illustrated by Example 2 and Equations 3 to 4 inclusive takes place readily to yield products having the type formulae:

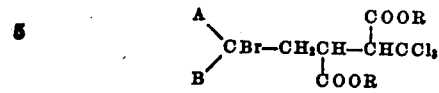

and

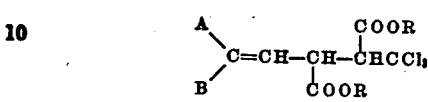

where A, B and R are as previously defined.

The reactions involved in the present invention may be summarized by the following series of equations:

1. 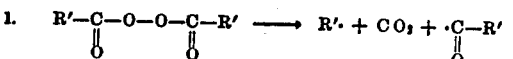

2. 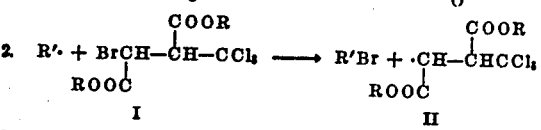

3. 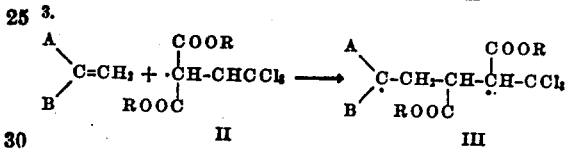

4. 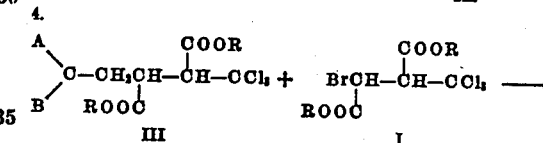

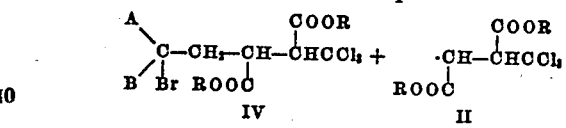

5. 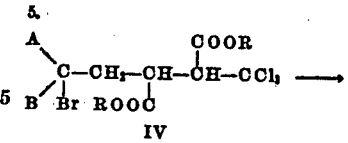

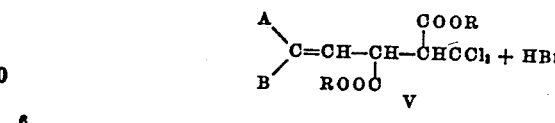

6. 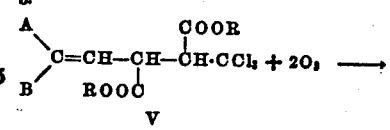

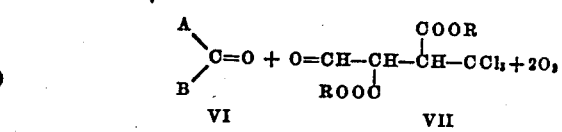

Equation 1 illustrates the formation of free radicals by the decomposition of a diacyl peroxide and one of these free radicals can react as in Equation 2 with a molecule of alpha bromo beta trichloromethyl dialkyl succinate (I) to remove a bromine atom forming an organic bromide and a free dialkyl beta trichloromethyl succinate radical II. Equation 3 illustrates the addition of radical II to a terminally unsaturated olefinic compound to form the new free radical III which as shown in Equation 4 can remove a bromine atom from a molecule of a dialkyl alpha bromo beta trichloromethyl succinate to form a molecule of the 1,1,1-trichloro-5-bromo-2,3-dicarbalkoxy alkane derivative IV and generate another free radical II which by participating in reaction (3) can carry on the chain. Equation 5 illustrates the dehydrobromination of IV to form the alkene derivative V. Equation 6 illustrates the reaction whereby the structure of V is established. The identification of fragments VI and VII proves the location of the double bond in V.

I claim:

1. The process of producing a chemical from the class consisting of 1,1,1-trichloro-5-bromo-2,3-dicarbalkoxy alkanes, substituted 1,1,1-trichloro-5-bromo-2,3-dicarbalkoxy alkanes and their dehydrobrominated derivatives which comprises heating a reaction mixture containing a 1,1,1-trichloro-3-bromo-2,3-dicarbalkoxy propane, a terminally unsaturated olefin and a peroxidic polymerization catalyst.

2. The process of producing a 1,1,1-trichloro-2,3-dicarbalkoxy-4-alkene derivative which comprises heating a reaction mixture containing a 1,1,1-trichloro-3-bromo-2,3-dicarbalkoxy propane, a terminally unsaturated olefinic compound and a peroxidic catalyst until a 1,1,1-trichloro-5-bromo-2,3-dicarbalkoxy alkane derivative is formed treating the 1,1,1-trichloro-5-bromo-2,3-dicarbalkoxy alkane derivative with an alkaline dehydrobrominating agent and isolating the 1,1,1-trichloro-2,3-dicarbalkoxy-4-alkene.

3. The process of producing 1,1,1-trichloro-2,3-dicarbmethoxyundecene-4 which comprises heating a reaction mixture containing 1,1,1-trichloro-3-bromo-2,3-dicarbmethoxy propane, octene-1 and a diacyl peroxide until 1,1,1-trichloro-5-bromo-2,3-dicarbmethoxyundecane is formed, treating the 1,1,1-trichloro-5-bromo-2,3-dicarbmethoxyundecane with an alkaline dehydobrominating agent and isolating the 1,1,1-trichloro-2,3-dicarbmethoxyundecene-4.

4. The chemical 1,1,1,-trichloro-2,3-dicarbmethoxyundecene-4.

MORRIS S. KHARASCH.

No references cited.